United States Patent
Elgert et al.

(10) Patent No.: US 7,019,994 B2
(45) Date of Patent: Mar. 28, 2006

(54) SWITCHED-MODE POWER SUPPLY WITH A DAMPING NETWORK

(75) Inventors: Achim Elgert, Dauchingen (DE); Michel Thibault, Angers (FR); Jean-Paul Louvel, Brigachtal (DE)

(73) Assignee: Thomson Licensing, Boulogne-Billancourt (FR)

(*) Notice: Subject to any disclaimer, the term of this patent is extended or adjusted under 35 U.S.C. 154(b) by 148 days.

(21) Appl. No.: 10/485,499

(22) PCT Filed: Jul. 17, 2002

(86) PCT No.: PCT/EP02/07917

§ 371 (c)(1),
(2), (4) Date: Jan. 30, 2004

(87) PCT Pub. No.: WO03/012965

PCT Pub. Date: Feb. 13, 2003

(65) Prior Publication Data
US 2004/0184290 A1 Sep. 23, 2004

(30) Foreign Application Priority Data
Jul. 31, 2001 (DE) ............................... 101 37 176

(51) Int. Cl.
*H02M 5/42* (2006.01)
(52) U.S. Cl. .................... 363/82; 363/125; 363/47
(58) Field of Classification Search ............. 363/21.01, 363/21.02, 21.12, 21.16, 46, 47, 82, 90, 125, 363/126
See application file for complete search history.

(56) References Cited

U.S. PATENT DOCUMENTS 5,278,748 A * 1/1994 Kitajima .................. 363/21.02
5,898,581 A * 4/1999 Liu ............................. 363/53

FOREIGN PATENT DOCUMENTS

| DE | 40 29 221 | 3/1992 |
| EP | 0 695 023 | 1/1996 |
| JP | 10248254 | 9/1998 |

OTHER PUBLICATIONS

See copy of International Search Report attached to PCT Publication.

* cited by examiner

*Primary Examiner*—Jessica Han
(74) *Attorney, Agent, or Firm*—Joseph S. Tripoli; Harvey D. Fried; Sammy S. Henig

(57) ABSTRACT

The switched-mode power supply contains a transformer, a switching transistor in series with the primary winding of the transformer, and a damping network on the secondary side, which has a connection for a further secondary winding via which energy is transferred from this damping network, by way of example, to a charge-storage capacitor which is coupled to this secondary winding. The connection is advantageously produced via a rectifying element, for example a diode, which is coupled after the rectifying diode (D5) for the second secondary winding. In a further exemplary embodiment, the diode in the series circuit, which is connected in parallel with the rectifier diode for the first secondary winding, is not coupled to the charge-storage capacitor for the first secondary winding, but is likewise coupled to the charge-storage capacitor for the second secondary winding.

21 Claims, 2 Drawing Sheets

SWITCHED-MODE POWER SUPPLY WITH A DAMPING NETWORK

This application claims the benefit under 35 U.S.C. § 365 of International Application PCT/EP02/07917, filed Jul. 17, 2002, which claims the benefit of German Patent Application No. 101 37 176.4, filed Jul. 31, 2001.

FIELD OF THE INVENTION

The invention is based on a switched-mode power supply having a transformer and having a switching transistor, which is connected in series with the primary winding of the transformer. Switched-mode power supplies of this type are used, for example, in televisions, video recorders or computer monitors, and preferably operate as flyback converters, in a power range from about 50 to 150 watts.

BACKGROUND OF THE INVENTION

In the flyback converter mode, energy is stored in the transformer during the phase in which the switching transistor is switched on, and this is subsequently transmitted to the secondary side, during the phase in which the switching transistor is switched off. In this case, however, disturbing voltage spikes are produced when the switching transisitor switches off, and these lead to a severe voltage load on the switching transistor, as well as causing radiated interference. It is thus known for a damping network, also referred to as a snubber network, to be provided in parallel with the primary winding, and this network is used to limit the voltage spikes of the current input of the switching transistor when the switching transistor switches off. This network normally has a capcitor in parallel with the primary winding, which capcitor is charged when the switching transistor is switched off, and whose energy is then emitted to an energy-storage capacitor on the input side, or is consumed in a resistor and converted into heat. A damping network of this type is known, by way of example, from DE-A-40 29 221.

EP-A-0 695 023 discloses a switched-mode power supply which, in addition to a damping network in parallel with the primary winding, also has a second damping network in parallel with a winding on the secondary side of the transformer. In this case, a series circuit formed by a capcaitor and a second diode is connected in parallel with a rectifying diode, which produces a desired output voltage across a charge-storage capacitor, and the centre point of this series circuit is connected to a reference potential via a diode and an inductance. Energy is in this case likewise transferred to the charge-storage capacitor via this capacitor, for energy recovery purposes, when the switching transistor switches off.

The method of operation of this switch-mode power supply will now be described in more detail with reference to FIG. 1. This switched-mode power supply has a network connection UN, to which a network rectifier 1 followed by an energy-storage capacitor C0 are connected, across which a DC voltage U0 is produced. This is applied to a primary winding WP of a transformer TR, in series with which a switching transistor T1 is connected. The switching transistor T1 is driven in a known manner by a driver circuit 2, illustrated only symbolically here, with switching pulses 3. The switched-mode power supply in this case operates in particular in the flyback converter mode, in which energy is transferred from the transformer TR to one or more secondary windings during the phase in which the switching transitor T1 is switched off.

A damping network for damping voltage spikes when the transistor T1 is switched off is connected in parallel with the primary winding WP. This damping network has a series circuit formed by a capacitor Cs and a diode Ds, with a resistor Rs being connected in parallel with its diode. The voltage spikes which are produced when the switching transistor T1 switches off are in this case absorbed by the capacitor Cs and are partially fed back via the diode Ds to the energy-storage capacitor C0, while the remainder is converted into heat in the resistor Rs.

On the secondary side, the switched-mode power supply has a secondary winding W1, which provides a desired output voltage U1 across a rectifier diode D1 and a charge-storage capacitor C1. In order to suppress voltage spikes and in order to reduce the power losses in the switched-mode power supply, a damping network is likewise coupled to the secondary winding W1. This damping network has a first series circuit with a capacitor C2 and a diode D2 in parallel with the diode D1, as well as a second series circuit with an inductance L1 and a diode D4, which is arranged between a tap a on the first series circuit and a reference potential. A resistor R1 is also connected in parallel with the inductance L1 and is used to damp oscillations between this inductance and the capacitor C2.

The network on the secondary side, as shown in FIG. 1, operates as follows: during the phase in which the switching transistor T1 is switched on, the voltage Us on the secondary winding W1 is negative, so that the capacitor C2 is charged via the inductance L1 and the diode D4. Thus, in the process, energy is stored in the capacitor C2, with the inductance L1 limiting the current rise during the charging process. When the switching transistor T1 is switched off, the voltage Us rises rapidly, until, in the end, the voltage U1 is reached, and the diode D1 changes to the forward-biased state, with the charge-storage capacitor C1 thus once again being recharged. However, the output voltage U1 is reached at an earlier stage across the capacitor C2, since the centre point a of the series circuit formed by C2 and D2 is positive with respect to the voltage Us. The diode D2 thus becomes forward-biased before the diode D1, so that the voltage rise of the voltage Us is damped. The energy in the capacitor C2 is likewise transferred to the charge-storage capacitor C1 during this process. In this case, any oscillations which occur between the capacitor C2 and the inductance L1 are damped by the resistor R1. Further details of the operation of this damping network are described in EP-A-0 695 023, which is hereby referred to.

A further damping network with a damping network on the primary side and a damping network on the secondary side is known from EP-A-0 279 335.

SUMMARY OF THE INVENTION

The object of the present invention is to reduce the power losses in a damping network on the secondary side of the previous type.

This object is achieved by a switched-mode power supply according to claim 1. Advantageous developments of the invention are specified in the dependent claims.

According to the invention, the damping network has a connection for a second secondary winding, via which energy is transferred from this damping network, for example, to a charge-storage capacitor which is coupled to this secondary winding. The connection is advantageously produced via a rectifying element, for example a diode, which is coupled after the rectifying diode of the second secondary winding, thus preventing this secondary winding from having any reaction on the damping network.

In a further exemplary embodiment, the diode in the series circuit which is connected in parallel with the rectifier diode of the first secondary winding is not coupled to the charge-storage capacitor for the first secondary winding, but is likewise coupled to the charge-storage capacitor for the second secondary winding. This is particularly advantageous when the operating voltage of the first secondary winding is considerably higher than the operating voltage of the second secondary winding, so that this capacitor is discharged to a greater extent, and the damping characteristics of the network when the switching transistor is switched off are improved. An LC low-pass filter is also arranged, in particular, in the connection between this capacitor and the charge-storage capacitor for the second secondary winding, and is used to prevent disturbing voltage spikes on this charge-storage capacitor.

BRIEF DESCRIPTION OF THE DRAWINGS

The invention will be explained in more detail in the following text with reference, by way of example, to schematic drawings, in which.

DETAILED DESCRIPTION

Figure 1:
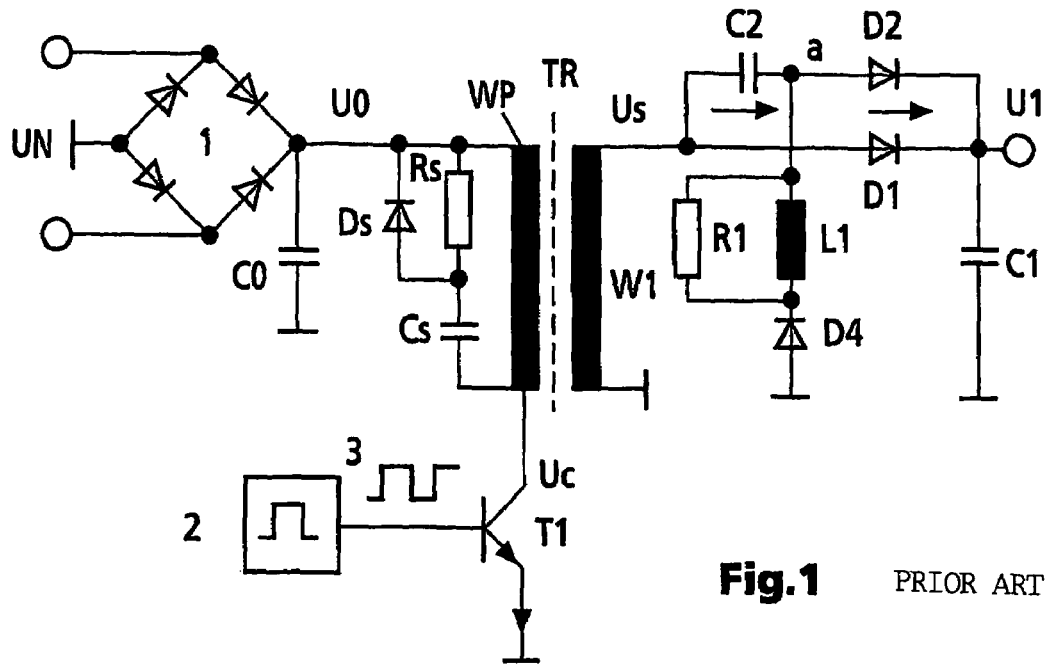
FIG. 1 shows a switched-mode power supply with a damping network according to the prior art arranged on the secondary side.
Figure 2:
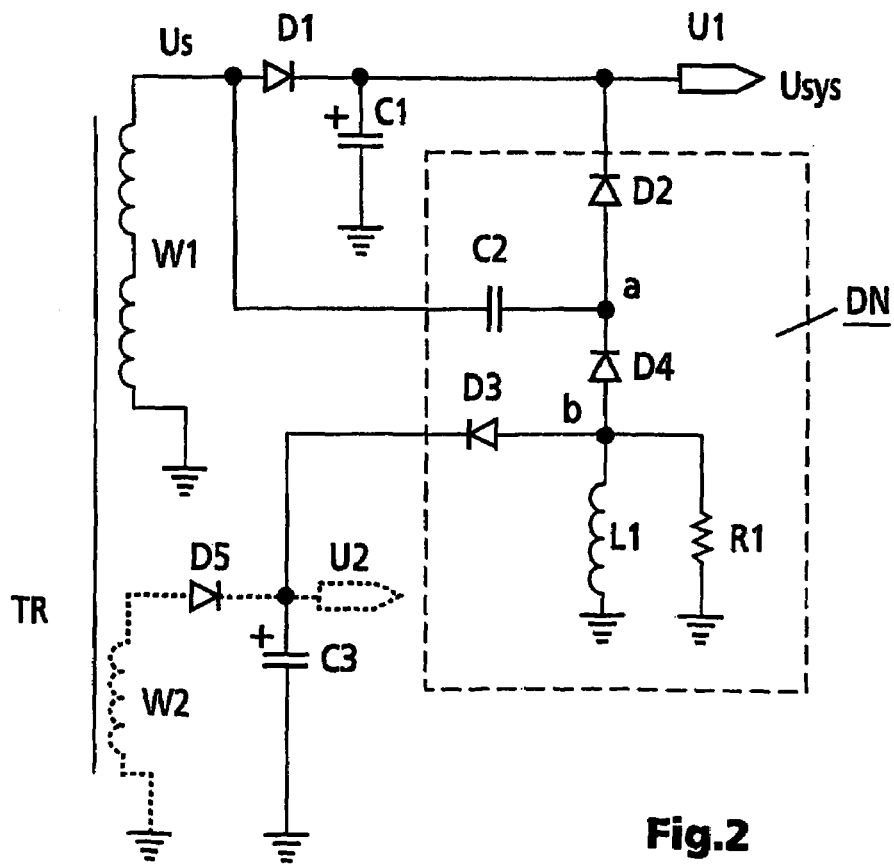
FIG. 2 shows a damping network according to the invention arranged on the secondary side, which supplies energy not only to a charge-storage capacitor for a first secondary winding, but also to a charge-storage capacitor for a second secondary winding.
Figure 3:
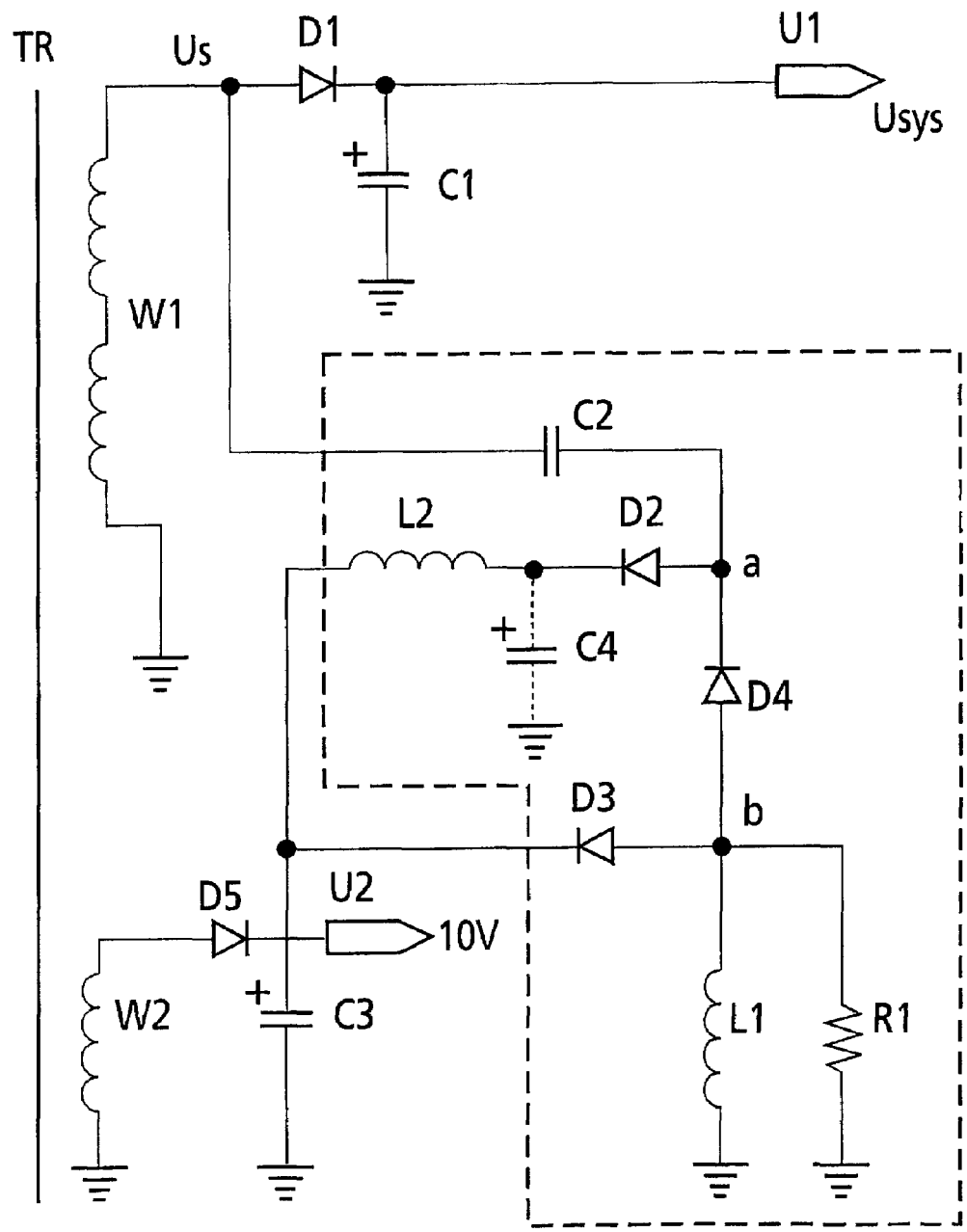
FIG. 3 shows a damping network arranged on the secondary side, which has two connections for a second secondary winding.

The switched-mode power supply according to the invention operates, by way of example, on the flyback converter principle, with a switching transistor in series with a primary winding of the transformer, as explained with reference to FIG. 1. However, it is not restricted to this principle. Reference should be made in particular to EP-A-0 695 023 for further details relating to the operation of this switched-mode power supply. FIGS. 2 and 3 show preferred exemplary embodiments of the invention, which relate to an improved damping network arranged on the secondary side. Identical components are thus provided with the same reference symbols. Furthermore, in FIGS. 2 and 3, the part of the switched-mode power supply which is on the primary side as well as further details of the secondary side, in particular regulation elements for voltage stabilization and further secondary windings, are not shown, since these do not relate to the present invention.

FIG. 2 shows, schematically, a transformer TR for a switched-mode power supply with secondary windings W1 and W2, and arranged on the secondary side. The secondary winding W1 in this case produces a first operating voltage U1 via a diode D1 and a charge-storage capacitor C1, and the secondary winding W2 produces a second operating voltage U2 via a diode D5 and a charge-storage capacitor C3. The operating voltages U1 and U2 are used in particular for supplying electronic circuits in a television.

Furthermore, the circuit as shown in FIG. 2 has a damping network DN, which is coupled on the input side to the secondary winding W1 and on the output side to the charge-storage capacitors C1 and C3. It contains a series circuit comprising a capacitor C2 and a diode D2 in parallel with the diode D1, by means of which energy is transferred from the secondary winding W1 to the charge-storage capcitor C1, as already described in the introduction. Furthermore, a series circuit comprising an inductance L1, for example a coil with an inductance of 100 µH, and a diode D4 is coupled to a junction point a between the capacitor C2 and the diode D2, thus allowing a current to flow from a reference potential in the direction of the junction point a. A resistor R1 is also connected in parallel with the inductance L1. To this extent, this circuit corresponds to the damping network as described in FIG. 1, with the exception of the change in the sequence of L1 and D4

According to the invention, a junction point between the junction point a and the inductance L1, in this exemplary embodiment a junction point b between the diode D4 and L1, is now connected to a second secondary winding W2 of the transformer TR. The connection is in this case produced via a diode D3, by means of which the inductance L1 is coupled to the charge-storage capacitor C3.

This circuit in this case operates as follows: when the switching transistor in the switched-mode power supply is switched on, the voltage Us on the secondary winding W1 is negative, so that the capacitor C2 is charged via the diode D4 and the inductance L1, corresponding to the negative forward voltage on this secondary winding. L1 in this case limits the charging current and in consequence results in the capacitor C2 being charged slowly when the switching transistor switches on.

When the switching transistor switches off, the voltage Us rises very rapidly and, when the voltage at the junction point a reaches the voltage U1, the diode D2 becomes forward-biased, so that the capacitor C2 is discharged in is the direction of the charge-storage capacitor C1. In the process, the diode D2 becomes forward-biased as a result of the positive voltage across the capacitor C2 upstream of the diode D1 so that, in consequence, the voltage rise of the voltage Us is limited, and the coupling between the transformer windings WP, W1 likewise limits the voltage rise across the switching transistor T1. The charge which the capacitor C2 taps off from the secondary winding W1 in the process is in consequence fed back into the system once again, and is thus not lost. However, oscillations occur in this case between the capacitor C2 and the inductance L1, and these must be damped by the resistor R1. However, these oscillations are now additionally damped by the diode D3, so that the power loss in the resistor R1 is considerably reduced.

FIG. 3 shows a further exemplary embodiment of a damping network according to the invention, arranged on the secondary side. However, in this case, the diode D2 is not coupled to the charge-storage capacitor C1 but, in the same way as the diode D3, is likewise coupled to the charge-storage capacitor C3 for the secondary winding W2. This is particularly advantageous when the voltage U1 is considerably greater than the voltage U2. In this exemplary embodiment, the voltage U1 is the system voltage Usys of, by way of example, 130 volts, and the operating voltage U2 is a voltage of 10 volts, so that the capacitor C2 can be discharged to a greater extent when the voltage Us on the secondary winding W1 is high. This achieves a greater damping effect.

Since, in this exemplary embodiment, the operating voltage U2 is used as a video supply voltage, a filter element, comprising an inductance L3 and a capacitor C4, is also arranged between the diode D2 and the charge-storage capacitor C3. This avoids picture interference resulting from voltage spikes on the supply voltage U2.

Further refinement forms of the invention are within the scope of a person skilled in the art and, by way of example, the diode D2 may also be connected to a further secondary winding of the transformer TR, instead of being connected to the secondary winding W2. In the exemplary embodiments explained here and in the claims, diodes are preferably used as the rectifying elements. However, within the scope of this invention, other rectifying elements, for example transistors which are switched for voltage rectification purposes, may also be used instead of diodes.

What is claimed is:

1. Switched-mode power supply having a transformer and a switching transistor in series with the primary winding of the transformer,
   whose first secondary winding is connected via a first diode to a charge-storage capacitor which provides a first operating voltage, and is connected via a series circuit with a second diode to said charge-storage capacitor,
   and a first junction point of the series circuit is connected via an inductance (L1) to a reference potential, wherein a fourth diode is arranged between the reference potential and the first junction point, and a second junction point (b) between the inductance and the first junction point is connected to a second secondary winding of said transformer providing a second operating voltage.

2. Switched-mode power supply according to claim 1, wherein the second junction point is coupled via a rectifying element, in particular a third diode, to a charge-storage capacitor coupled to said second secondary winding.

3. Switched-mode power supply according to claim 2, wherein the fourth diode is arranged between the first inductance and the first junction point, and in that an anode of the rectifying element is coupled to the second junction point.

4. Switched-mode power supply according to claim 1, wherein the series circuit has a second capacitor in series with the second diode, and in that the first junction point is arranged between the second capacitor and the second diode.

5. Switched-mode power supply according to claim 1, wherein the second diode is not coupled to the first secondary winding, but is coupled to the second secondary winding or to a further secondary winding of the transformer.

6. Switched-mode power supply according to claim 5, wherein the cathode of the second diode is coupled to a charge-storage capacitor for said second secondary winding.

7. Switched-mode power supply according to claim 5, wherein a filter is arranged between the second diode and this secondary winding.

8. Switched-mode power supply according to claim 7, wherein the filter is an LC low-pass filter.

9. Switched-mode power supply according to claim 1, wherein the first operating voltage is the system voltage of a television or of a monitor and is, by way of example, more than 100 V, and the second operating voltage is a low operating voltage, in particular of less than 20 V.

10. Switched-mode power supply comprising
    a transformer with a primary winding and a first and a second secondary winding, both secondary windings being arranged on the secondary side of the switched-mode power supply, and
    a switching transistor in series with said primary winding, the first secondary winding being connected via a first diode to a charge-storage capacitor which provides a first operating voltage, and being connected via a series circuit with a second diode to said charge-storage capacitor,
    and a first junction point of the series circuit is connected via an inductance to a reference potential, wherein a second junction point between the inductance and the first junction point is coupled to said second secondary winding.

11. Switched-mode power supply according to claim 10, wherein the second junction point is coupled via a rectifying element, in particular a third diode, to a charge-storage capacitor coupled to said second secondary winding providing a second operating voltage.

12. Switched-mode power supply according to claim 10, wherein a fourth diode is arranged between the reference potential and the first junction point.

13. Switched-mode power supply according to claim 11, wherein the fourth diode is arranged between the first inductance and the first junction point, and in that an anode of the rectifying element is coupled to the second junction point.

14. Switched-mode power supply according to one of the preceding claim 10, wherein the series circuit has a second capacitor in series with the second diode, and in that the first junction point is arranged between the second capacitor and the second diode.

15. Switched-mode power supply according to claim 11, wherein the first operating voltage is the system voltage of a television or of a monitor with more than 100 V, and the second operating voltage is a low operating voltage of less than 20 V.

16. Switched-mode power supply comprising
    a transformer with a primary winding and a first and a second secondary winding, said first secondary winding being coupled via a first diode to a charge-storage capacitor providing an operating voltage,
    a switching transistor in series with said primary winding,
    a series circuit comprising a second diode and first junction point, which is coupled via an inductance to a reference potential, said series circuit being coupled to said first secondary winding, wherein
    a second junction point between the inductance and the first junction point is connected to said second secondary winding, and
    the second diode is coupled to said second secondary winding or to a further secondary winding of said transformer.

17. Switched-mode power supply according to claim 16, wherein the cathode of the second diode is coupled to a charge-storage capacitor for said second secondary winding providing second operating voltage.

18. Switched-mode power supply according to claim 16, wherein a filter is arranged between the second diode and said second secondary winding.

19. Switched-mode power supply according to claim 18, wherein the filter is an LC low-pass filter.

20. Switched-mode power supply according to claim 17, wherein the first operating voltage is the system voltage of a television or of a monitor with more than 100 V, and the second operating voltage is a low operating voltage of less than 20 V.

21. Switched-mode power supply according to claim 16, wherein a fourth diode is arranged between the first junction point and the second junction point.

* * * * *